3,153,635
KAOLIN CRACKING CATALYSTS HAVING IMPROVED OXIDIZING CHARACTERISTICS
George R. Bond, Jr., Paulsboro, N.J., assignor to Air Products and Chemicals, Inc., a corporation of Delaware
No Drawing. Filed Oct. 26, 1959, Ser. No. 848,522
4 Claims. (Cl. 252—432)

The present invention relates to improvements in the regeneration characteristics of kaolin cracking catalysts and is particularly concerned with the treatment of available kaolin cracking catalyst to impart thereto the desirable characteristic of promoting more complete combustion on regeneration of carbonaceous or hydrocarbonaceous deposits normally formed therein during use of such catalysts in cracking or other hydrocarbon conversion reactions.

Many innovations have been proposed in the preparation of natural as well as synthetic cracking catalysts; however, relatively few of these innovations have warranted commercial development and even fewer have withstood the test of market acceptance. One of these innovations resulting in an acceptable natural cracking catalyst is of the type generally described in U.S. Patent No. 2,904,520. Therein is pointed out that kaolin, an abundant and natural clay, by a deliberate sulfation treatment to a sulfate content of at least 10% on the dry weight of the clay followed by a thermal desulfation step results in the formation of a commercially acceptable cracking catalyst which has been widely marketed in recent years.

Not all cracking catalysts from different sources have the same attributes; for instance, they may differ in gasoline producing ability in cracking heavy hydrocarbons, some may produce more gas, some produce in the cracking operation different quantities of the several products and may, likewise, differ in the by-product quantity and quality formation.

It has been found frequently with commercial kaolin cracking catalyst that during the oxidative regenerative treatment to remove hydrocarbonaceous (coke) deposits, resulting from the catalytic cracking the hydrocarbon charge stocks, of flue gases therefrom contain relatively large amounts of incompletely oxidized carbon oxides. Thus, one may find in such flue gas mixtures, in the carbon oxides present, that approximately ⅓ is carbon monoxide. This relatively high quantity of carbon monoxide can cause problems in the flue gas collection and disposal systems in that the relative high amounts of combustible material oxidize in the presence of oxygen in the flue gas streams to the more saturated carbon dioxide with the release of sizeable amounts of heat.

It has now been found that the kaolin cracking catalyst can be suitably modified to promote substantially complete combustion of the carbon forms present in the catalyst during such oxidation-regeneration treatments and thus alleviate if not completely cure the subsequent oxidation in the flue gas recovery system. This modification, likewise, has been found to be obtained with little or no undesirable side effects on other desirable catalytic activities of the kaolin cracking catalysts.

In accordance with this invention kaolin cracking catalyst having improved combustion promoting characteristics is treated to deposit thereon and therein from 0.3 to 2.5% by weight of the final catalyst of the oxides of metals of atomic number 57 through 60, perferably as oxides of the naturally occurring rare earths. It has been found further that the important beneficial aspects inherent in the incorporation of such oxides in the kaolin cracking catalysts are additionally enhanced by the further incorporation in such cracking catalysts of 0.25 to 3% by weight of the final the final catalyst of a boron component (measured as $B_2O_3$), such as in the form of boric acid or of rare earth borates.

The rare earth oxides and/or the rare earth borates may be incorporated in the kaolin catalyst by any suitable means such as by impregnation of the final form of the kaolin catalyst pellets or by incorporation as by mixing or impregnation, either separately or jointly, with the kaolin itself during preliminary stages of its preparation. One convenient method of incorporation is in the utilization of solutions of the decomposable rare earth nitrates; or equally suitable, the rare earth sulfates both of which can be decomposed to the oxide form during the regular desulfation treatment normally utilized in the preparation of kaolin cracking catalyst. The rare earth nitrates have the additional advantage of being heat decomposable, thus permitting their incorporation, as by impregnation, in the final kaolin catalyst pellets which may then be given a moderate heat treat to effect decomposition of the nitrate to the acceptable oxide form. The conversion of the rare earth sulfates and rare earth nitrates to the respective oxide forms may be effected, for example, in a gaseous atmosphere at an elevated temperature within the range of from 750 to 1600° F.

Boric acid may be considered as one of the more acceptable forms for the introduction of boron into the catalyst because of its physical and chemical properties; however, other compounds containing boron, which will react with the rare earth compounds to form rare earth borates and without adding objectionable components to the catalyst in its final state, may be used; but not necessarily with the same degree of effectiveness. The introduction of the boron compound may be either prior to, simultaneously with, or after the incorporation of the rare earth component.

A fuller understanding of the invention will be had from the following examples depicting the application thereof in several different embodiments. It is to be understood that these examples are for illustrative purposes only and are not intended as limiting either as to the method of incorporation, the types of starting materials or the quantity and final nature of the components of the finished catalyst.

*Example I*

A sample of commercially available kaolin cracking catalyst was prepared by admixture of raw washed kaolin with 66° Bé. sulfuric acid, extruding to pellets, denning in a refractory oil at a temperature of about 300° F. for 4 hours and then further treating the sulfated kaolin, containing approximately 37% by weight $SO_4$ ion (on 105° C. dry sulfated clay basis), to decompose thermally the sulfate therein at a temperature of about 1500° F. for 8 hours in a reducing gas stream containing a high percentage of steam. Such catalyst was used in a test method for catalytic conversion of heavy gas oil charge.

The test method used a heavy East Texas gas oil (approximately 44–77% E. Texas crude, of 31.6° API, and boiling in the range, vacuum assay, of about 468 to 885+° F.) as the charge stock. Measured quantity of oil is preheated and contacted with a measured quantity of catalyst for a uniform period of time at a temperature of 900° F.±5° F. At the end of this on-stream period, the catalyst is purged with nitrogen and then subjected to oxidative regeneration by passage of heated air over the catalyst to remove coke deposited during the on-stream period. The amount of coke is determined by measurement of the amount of carbon oxides formed during the regeneration and conversion of the measurement through the use of a suitable formula to give the weight percent coke.

When the catalyst was tested in this test method analysis of the carbon oxides formed during regeneration showed a ratio of carbon monoxide to carbon dioxide in the order of 1 to 3.

*Example II*

240 grams (300 cc.) of the finished kaolin catalyst of Example I was impregnated with approximately 92 ml. of an aqueous solution containing 6.1 grams of rare earth nitrates (thorium-free) amounting to approximately 4.6 grams $R_2O_3$ or about 2 weight percent of the finished dry (105° C.) catalyst. The rare earth nitrates were commercially available salt remaining after the supplier had removed most of the thorium for other purposes. The composition of such salt was, approximately, equivalent to 24.9% $Ce_2O_3$, 25.1% $La_2O_3$, and 25.5%

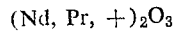

The remaining 24.5% was mainly volatilizable material including water of crystallization. The impregnated pellets were oven dried at 180° F. and then heat treated at 1350° F. for 4 hours in a flowing atmosphere of steam. This catalyst was tested under conditions similar to that of the testing of the catalyst of Example I. The ratio of carbon monoxide to carbon dioxide was reduced to 1 to 8 in the analyzed regeneration gas, and no adverse effects during on-stream operation of the catalyst were observed.

*Example III*

Another sample of the finished catalyst of Example I amounting to 240 grams (300 cc.) was impregnated with an aqueous solution containing 6.1 grams of rare earth nitrates (thorium-free) from the same source as in Example II and 3.48 grams of $H_3BO_3$. This solution, having a volume of 91 ml., was sufficient to just saturate the pellets being impregnated. The calculated amounts of rare earth oxide and boron oxide were 1.96% and 0.84% by weight respectively. The pellets were dried at 180° F. and then heat treated at 1350° F. in a flowing atmosphere of 100% steam for 4 hours. This catalyst was tested similarly to that of the catalysts of Examples I and II.

The effluent gas from regeneration contained no carbon monoxide.

*Example IV*

A sample of 5 kg. of raw kaolin (4.31 kg. ignited basis) similar to that employed in the preparation of the catalyst of Example I, was admixed with a solution of approximately 66° Bé. sulfuric acid containing dissolved therein 24.5 grams of $H_3BO_3$ and 57.3 grams of rare earth nitrate (thorium-free) from the same source as in Example II. This impregnation deposited approximately 1.0 weight percent of the total catalyst (ignited basis) of rare earth oxides and 0.32% of boron oxide. The mixing was continued with the addition of .91 ltrs. of sulfuric acid with some evolution of nitric acid fumes. The mixture was extruded through 4 mm. die openings in a commercial auger extrusion machine and the extrudate was cut into discrete pellets of length approximately equal to diameter. The pellets were placed in cold denning oil and the temperature was raised to 300° F. and maintained for 4 hours. The denned material was drained and then desulfated at 1500° F. for 4 hours in an atmosphere of 85% steam and 15% hydrogen. A subsequent heat treatment at 1450° F. for 4 hours in an atmosphere of 100% steam was given to test stability. This catalyst was tested in substantially the same manner as the catalysts in Examples I to III. During the oxidative regeneration the effluent gas showed a complete conversion to carbon dioxide as evidenced by the absence of carbon monoxide in the analysis.

*Example V*

Another 5 kg. sample of the same raw kaolin clay used as starting material in Example IV was employed as the starting material in this example. 21 grams of powdered monazite sand were put into solution with 50 ml. of sulfuric acid and boiling for approximately ½ hour. Analysis of the monazite sand (from India) showed that approximately 60% of the sand was composed of the oxides of lanthanum, cerium, neodymium and praseodmium. This solution was dispersed in 1 ltr. of 93.2% sulfuric acid. The raw kaolin was mixed with approximately 20 grams of $H_3BO_3$. To the mixture of boric acid and clay the acid solution prepared above was admixed, plus an additional 770 ml. of concentrated sulfuric acid. The mixture was subjected to further mixing for 20 minutes in a conventional blade and roll mixer and then extruded in a commercial auger machine with a 4 mm. die plate, formed into pellets and placed in cold denning oil. The temperature was raised to 300° F. and the samples were denned for 4 hours. The pellets were freed of oil and heat treated by raising the temperature to 1500° F. for 4 hours, in an atmosphere of 15% hydrogen and 85% steam, with subsequent cooling to 1100° F. in 100% steam. Testing of this catalyst subsequently in a manner similar to the preceding examples showed, upon analysis of the regeneration effluent gas, excellent combustion characteristics in that the ratio of carbon monoxide to carbon dioxide was less than 1 to 9.

From the foregoing examples it is evident that oxides of rare earths when added to commercially available kaolin cracking catalyst contribute combustion catalyzing properties. These new catalysts are at least as good in combustion properties as other commercially available cracking catalyst materials, including those prepared from the sub-bentonites and the synthetics. In addition, it is evident that the presence of boric acid has a beneficial promotion effect in conjunction with the properties introduced by the addition of the rare earth oxides.

Obviously, many modifications and variations of the present invention as hereinbefore set forth may be made without departing from the spirit and scope thereof and therefore only such limitations should be imposed as are indicated in the appended claims.

What is claimed is:

1. The method of producing active contact masses characterized in having improved combustion characteristics which consists essentially in treating kaolin clay to incorporate therewith at least one of the oxides of the metals having atomic number 57 through 60 in an amount of from 0.3 to 2.5% by weight of said oxides based on the final active contact masses and activating said kaolin by a process including sulfation followed by thermal desulfation.

2. An active contact mass characterized in improved combustion promoting characteristics, said mass comprising 99.45 to 94.5% by weight of activated kaolin clay 0.3 to 2.5% by weight of the oxides of the metals of atomic number 57 through 60, and a boron equivalent of 0.25 to 3% by weight of boron oxide.

3. The method of preparing active contact masses having improved combustion promoting characteristics which comprises admixing activated kaolin clay with at least one of the oxides of metals having atomic number 57 through 60 and a boron component to obtain active contact masses which contain 99.45 to 94.5% by weight of activated kaolin, 0.3 to 2.5% by weight of oxides of metals of atomic number 57 through 60 and a boron equivalent of 0.25 to 3% by weight of boron oxide.

4. The method of preparing active contact masses having improved combustion characterisitics which comprises admixing kaolin clay with a mixture of a sulfating agent sufficient to sulfate said clay to a sulfate content of at least 10% on the dry weight of the clay, boric acid sufficient to provide 0.25 to 3% by weight of boron oxide on the final mass dry weight and rare earth nitrate sufficient to provide 0.3 to 2.5 weight percent as the oxides of metals of atomic number 57 through 60 on the final mass dry weight; forming said admixture into discrete particles; aging said particles at a temperature of at least 300° F. for a time period of at least 4 hours; and thereafter subjecting said aged particles to treatment in a gaseous atmosphere at an elevated temperature in the range of 750 to 1600° F.

References Cited in the file of this patent

UNITED STATES PATENTS

| | | |
|---|---|---|
| 2,129,733 | Fulton et al. | Sept. 13, 1938 |
| 2,148,342 | Farichild | Feb. 21, 1939 |
| 2,206,021 | Blunck | July 2, 1940 |
| 2,337,191 | Greensfelder et al. | Dec. 21, 1943 |
| 2,339,248 | Danforth | Jan. 18, 1944 |
| 2,339,302 | Thomas et al. | Jan. 18, 1944 |
| 2,949,429 | Bailey et al. | Aug. 16, 1960 |
| 2,988,518 | Milliken | June 13, 1961 |